R. C. RIDDICK.
OVERHEAD TRANSPORTATION APPARATUS.
APPLICATION FILED FEB. 17, 1920.
1,355,911.
Patented Oct. 19, 1920.
2 SHEETS—SHEET 2.
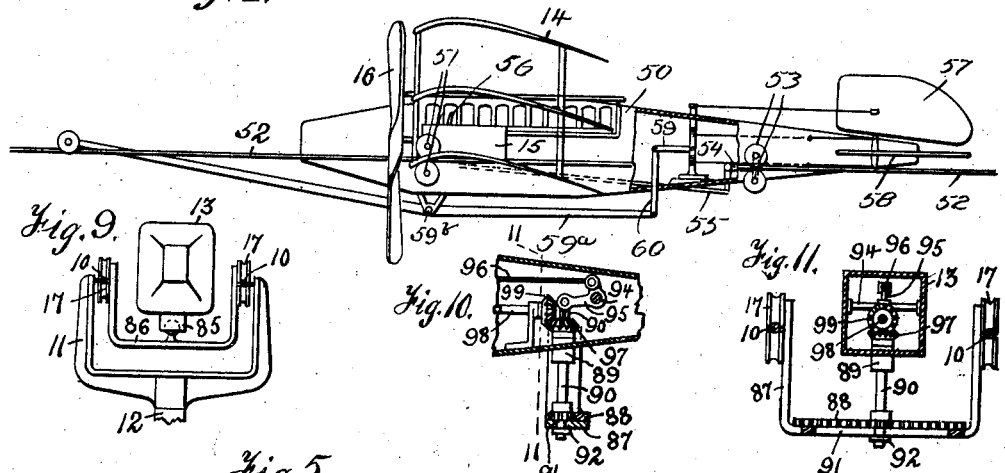
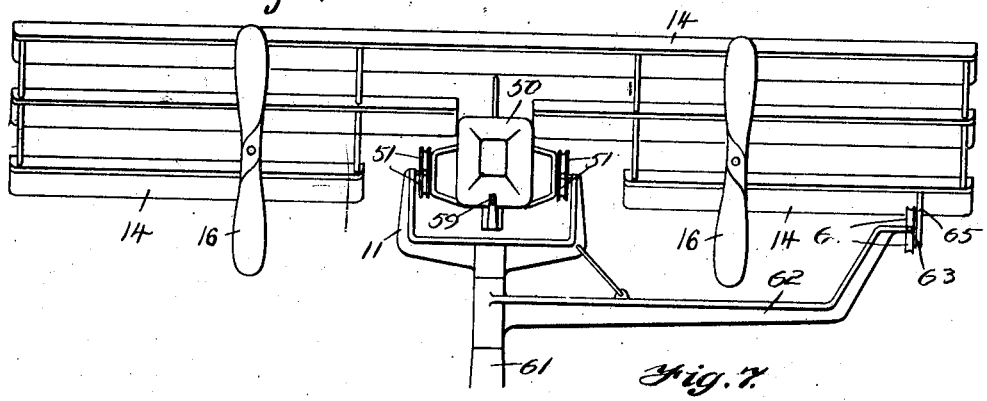
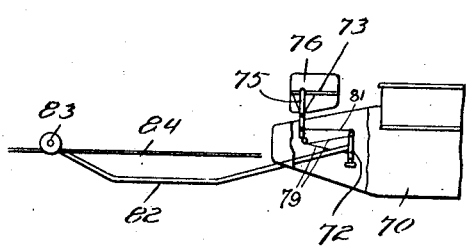
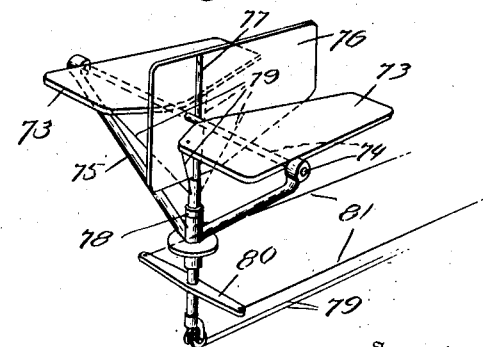
Inventor
R. C. Riddick.
By Geo. T. Kimmel
Attorney

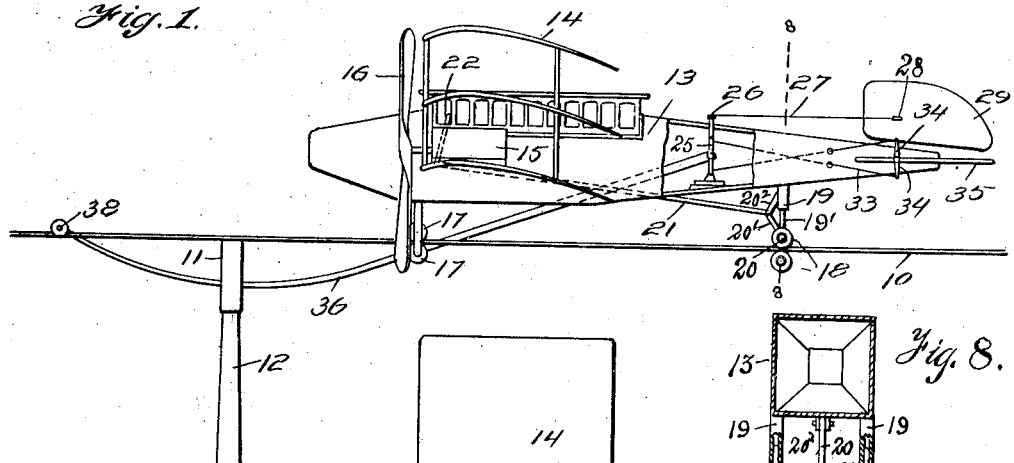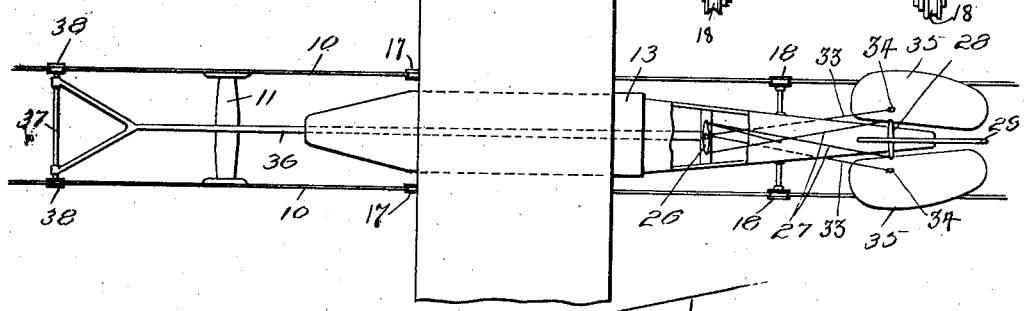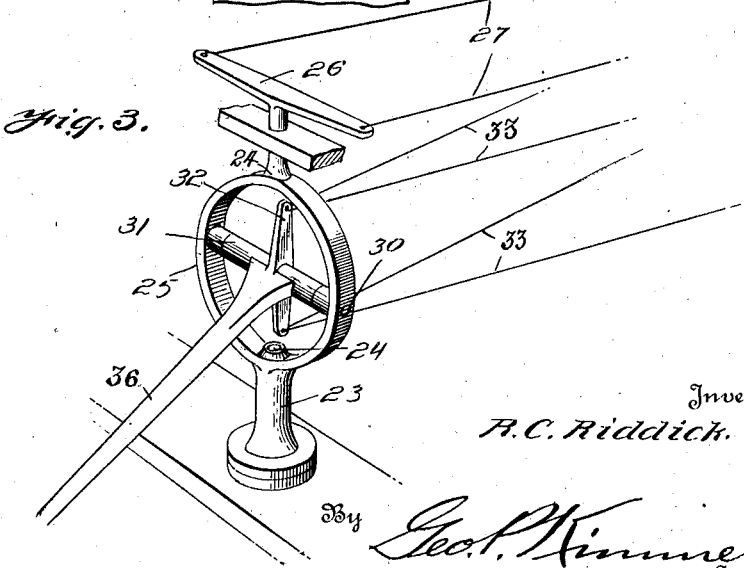

UNITED STATES PATENT OFFICE.

ROLLAND C. RIDDICK, OF WASHINGTON, DISTRICT OF COLUMBIA.

OVERHEAD TRANSPORTATION APPARATUS.

1,355,911. Specification of Letters Patent. Patented Oct. 19, 1920.

Application filed February 17, 1920. Serial No. 359,296.

*To all whom it may concern:*

Be it known that I, ROLLAND C. RIDDICK, a citizen of the United States, and resident of Washington, in the District of Columbia, have invented certain new and useful Improvements in Overhead Transportation Apparatus, of which the following is a specification.

This invention has for its object to provide an overhead carrier embodying such features of structural simplicity and practicability as to afford a safe, quick and economical means of transportation for passenger and freight service.

A further object is the provision of an apparatus of this character wherein an aeroplane of conventional construction is employed whereby the self sustaining qualities thereof are utilized, during movement of the carrier, to relieve the supporting track structure of weight, reduce friction and permit the operation of the carriers at extremely high rates of speed, and during atmospheric conditions otherwise prohibitive to flying.

A further object is the provision of novel automatic controlling mechanism responsive to variations in elevation or inclination of the track and also to curves therein and whereby to adjust the controls of the aeroplane according to the deviation in the track ahead.

A still further object resides in the provision of adequate means whereby the planes of the carrier are "banked" at curves in the track whereby the tendency of the carrier to continue in a straight course is counteracted and the course of the carrier more readily diverted to conform with the curve in the track ahead.

With these objects in view and others which will appear as the nature of the invention is better understood, the invention comprises the various novel features of construction and arrangement of parts, which will be more fully described hereinafter and set forth with particularity in the claims appended hereto.

Figure 1 represents a side elevation of the transporting apparatus, a fragment of the supporting track being shown.

Fig. 2 represents a fragmentary top plan view of the apparatus.

Fig. 3 represents a perspective view of a part of the automatic controlling mechanism for the carrier or aeroplane.

Fig. 4 represents a side elevation of a modification of the invention.

Fig. 5 represents a transverse sectional view of the track illustrating the modified type of the invention in front elevation.

Fig. 6 represents a fragmental side elevation of a further modification of the invention, having particular reference to a modification in the type of automatic controlling mechanism.

Fig. 7 represents a fragmental perspective view of the modified control.

Fig. 8 is an enlarged section on the line 8—8 of Fig. 1.

Fig. 9 is a front elevation illustrating a modification in the manner of mounting the forward portion of the body for universal movement.

Fig. 10 is a sectional detail illustrating the manner of mounting the rear portion of the body for universal movement.

Fig. 11 is a transverse section on the line 11—11 of Fig. 10.

Referring to the drawings in detail, the numerals 10 indicate spaced parallel tracks or cables arranged side by side and of such size as to support the weight of the carrier or aeroplane thereon and which will be hereinafter referred to as the "track". The tracks or cables are supported by preferred types of hangers 11 mounted upon the upper terminals of supporting posts 12 which are arranged at such intervals as to reduce the slack in the cables between the posts to the minimum, although the sustaining effect of the planes of the carrier tends to prevent the carrier from dropping to the relatively low portions of the track cables intermediate the posts.

The body 13 of the carrier or aeroplane is preferably in the form of the conventional fuselage of an aeroplane and is internally equipped for passenger or freight transportation, as desired. Horizontal and laterally extending planes 14 are supported adjacent the front of the body 13 and are arranged in the usual superposed relation suggested in Fig. 1.

Electric, explosive or other desired types of engines 15 are arranged on opposite sides of the body 13 and are connected with propellers 16.

The aeroplane is designed to travel above the tracks 10 and is supported thereon, at its front terminal, by combined guiding and supporting rollers 17 arranged above and below each cable whereby the carrier is supported in position and prevented from ascending due to the action of air on the planes 14. The track cables are sufficiently spaced to effectively maintain the equilibrium of the carrier or aeroplane and prevent either wing from dipping.

The rear or tail portion of the body 13 is provided with depending guide sleeves 19, and slidable in these sleeves are the upturned portions of bracket bars 19′, the latter extending in opposite directions and thence directed downwardly to form hangers for guide pulleys 18. The pulleys 18 operate above and below the tracks 10 in the same manner as the pulleys 17. The upper opposite pairs of the pulleys are connected by a transverse shaft 20, and mounted to swing upon this shaft is the lower member 20′ of a toggle lever, the upper toggle member $20^2$ being pivoted at $20^3$ to the fuselage or body 10.

The levers 20′ and $20^2$ are pivotally united at their confronting ends to an operating rod 21 which is connected at its forward terminal with a manually operable lever 22 located within convenient reach of the driver whereby the rear portion of the body may be maintained at the proper elevation to counteract varying atmospheric conditions.

A socket 23 having a vertically disposed bore is adequately supported in the medial portion of the body 13 and pivotally receives one of a pair of diametrically opposed trunnions 24 carried by a ring 25 whereby the latter is capable of turning on a vertical axis. The uppermost trunnion is connected with a cross arm 26 connected with rearwardly extending cables 27 attached to arms 28 arranged on opposite sides of the rudder 29 located at the rear extremity of the body for controlling the course of the carrier in a horizontal plane.

A horizontally disposed shaft 30 is supported diametrically in the ring 25 and pivotally supports a sleeve 31 rigidly connected with a pair of cross arms 32 each connected with a pair of rearwardly extending cables 33 attached to the upper and lower arms 34 of the horizontal rudders or elevators 35 whereby as the sleeve 31 is oscillated on the shaft 30 the elevators 35 are moved accordingly to vary the altitude of the carrier or aeroplane.

A relatively long controlling arm 36 is also rigidly connected with the sleeve 31 and extends forwardly and downwardly thereof to a point considerably ahead of the body 13 and rotatably supports a shaft 37, the latter carrying rollers 38 which rest upon and are guided by the tracks 10, the member 36 being moved laterally and vertically with relation to the body 13, according to the deviations in the track. The arm possesses sufficient resiliency to permit it to flex as when the rollers move upon banked portions of the track.

In the operation of the carrier, the latter is propelled by the propellers 16, and due to the action of the air upon the planes 14 the tracks 10 are relieved of the greater part of the weight of the aeroplane and its cargo. The pitch of the planes 14 is so regulated as to closely approximate the lifting efficiency thereof with the weight of the carrier and its cargo and thereby reduce the stress upon the track to a negligible degree.

In approaching a curve in the track, the variation is detected by the rollers 38 prior to the movement of the supporting wheels 17 upon the curved portion of the track and accordingly the position of the rudder 29 is automatically shifted through the arm 36, ring 25, arms 26 and cables 27 to cause the carrier to follow the curve in the track, and thereby relieve the latter of considerable lateral or horizontal stress incident to the movement of the carrier thereover.

Referring more particularly to the modification of the invention illustrated in Figs. 4 and 5, the carrier or aeroplane designated generally by the numeral 50 is constructed similarly to the type illustrated in Figs. 1 to 4, with the exception that the front supporting rollers or wheels 51 for the body are arranged upon the sides thereof adjacent the front terminal and embrace the tracks or cables 52. Adjacent its rear terminal, the body is supported by pairs of superposed rollers 53 which also embrace the tracks or cables 52 and each pair of rollers is supported in one arm of a bell crank 54 having its other arm connected by a rod 55 with a manually operable lever 56 whereby the rear supporting rollers may be adjusted vertically to vary the longitudinal inclination of the body of the carrier, as desired.

The control for the rudder 57 and elevators 58 is the same as that employed in connection with the type of invention illustrated in Figs. 1 to 4 except that the controlling arm 59 is connected by a link 60 with a lever $59^a$ in order to accommodate it to the arrangement of the track 52 with relation to the aeroplane body, the member $59^a$ being pivoted at $59^b$ to the body 50.

In this type of the invention, each supporting post 61 for the track 52 is provided with a supplemental horizontally projecting arm 62 in which is supported a supplemental track cable 63 engaged and embraced by rollers 64 mounted in a bracket 65 attached adjacent the tip of one of the planes of the carrier. The supplemental cable 63 is designed to maintain the balance of the carrier and prevent the latter from tipping to either side and is further utilized to either raise or lower the wing with which it is connected whereby the aeroplane is "banked" when taking curves in the track 52. In order to accomplish the desired banking of the carrier the cable 63 is either raised above or moved below its normal position with relation to the track 52, as will be understood, according to the direction in which it is desired to bank the aeroplane.

In the modification illustrated in Figs. 6 and 7, the body 70 of the carrier is provided with controls which are arranged adjacent each end thereof and are operated by a controlling mechanism 72 identical to the controlling device illustrated in detail in Fig. 3. The elevators 73 are mounted upon a shaft 74 pivotally mounted in a substantially V-shaped bracket 75, whereas the vertical rudder 76 is supported upon a vertically disposed shaft 77 journaled in a bearing member 78 provided adjacent the bottom of the bracket 75.

The shaft 77 is of hollow form and receives the controlling cables 79 which are connected at one terminal with the elevators 73 on opposite sides of the pivotal axes of the latter and are connected at their opposite terminals with the horizontal shaft of the automatic controlling device 72. The lower extremity of the shaft 77 is provided with a cross arm 80 connected by cables 81 with the cross arm of the trunnions of the ring of the controlling device 72 and, as in the type of carrier disclosed in Fig. 3, the controlling device 72 is provided with a forwardly projecting controlling arm 82 carrying rollers 83 which engage the supporting track 84.

In Figs. 9, 10 and 11 another modified construction is shown consisting in mounting the forward portion of body or fuselage 13 by a ball and socket joint 85 supported by a hanger frame 86 having upturned terminals which carry the forward guide pulleys 17.

The rear portion of the body is supported for both vertical and lateral adjustment, the ball and socket support of the forward part of the body permitting this adjustment.

The rear pulleys 18 are mounted upon a U-shaped frame 87 which also carries a gear rack 88.

Supported in a suitable bearing 89 in the body 13 is a vertical shaft 90 having a pinion 91 at its lower end engaging the rack 88. The shaft 90 extends at its lower end through a slot, indicated at 91', in the hanger 87, and is provided at its lower end below the hanger with a stop device 92 to hold the shaft from vertical movement relative to the hanger, while at the same time leaving it free to rotate and to be moved longitudinally of the member 87 within the range of the slot therein.

The shaft 90 extends into the interior of the body 13. Pivoted to a transverse rod 94 within the body 13 is a bell crank lever 95, the latter coupled by one arm to the shaft 90 and provided with an operating rod 96 leading from the other arm to a point convenient to the operator.

Mounted upon the shaft 90 is a bevel gear 97, the latter arranged, for instance by the well known fin and spline device, to cause the gear to rotate with the shaft while at the same time permitting the shaft to be moved through the gear. An operating shaft 98 is mounted for rotation in the body 13 and carries a bevel gear 99 engaging the bevel gear 97. The shaft 98 extends to a point convenient to the operator, like the rod 96.

By this arrangement it will be obvious that the rear part of the body may be adjusted vertically or laterally by actuating the rod 96 and the shaft 98.

What I claim is:

1. In a device of the character described, an aeroplane including propelling and sustaining means, track engaging wheels carried by the aeroplane, and means for manually adjusting certain of the wheels to vary the inclination of the sustaining means.

2. In a device of the character described, an aeroplane including a body and sustaining planes carried thereby, a track engaging supporting wheels carried by the body, and manually controlled means for adjusting certain of the wheels vertically to vary the inclination of the sustaining planes.

3. In a device of the character described, an aeroplane including an elevator and rudder, track engaging supporting wheels carried by the aeroplane, and means for automatically adjusting the rudder and elevators.

4. In a device of the character described, an aeroplane including a vertical rudder and elevators, track engaging supporting wheels carried by the aeroplane, and track engaging means for automatically controlling the rudder and elevator according to inclination and curves of the track.

5. In a device of the character described, an aeroplane, track engaging supporting wheels carried thereby, manually operable means for adjusting certain of the supporting wheels to vary the position of the aeroplane with relation to the track, said aeroplane including a rudder and elevator, and means for automatically controlling the rudder and elevator according to the inclination or curve of the track.

6. A device of the character described including an aeroplane, propelling means, track engaging supporting wheels carried by the aeroplane, and means for elevating or depressing one of the wings of the aeroplane to cause the latter to bank when taking a curve in the track.

7. In combination, a supporting track, a supplemental track, an aeroplane mounted to travel on the first mentioned track, and means connecting the terminal of one of the wings of the aeroplane with the supplemental track for banking the aeroplane when taking curves.

In testimony whereof I affix my signature hereto.

ROLLAND C. RIDDICK.